United States Patent
Takemura et al.

(10) Patent No.: US 6,357,924 B1
(45) Date of Patent: Mar. 19, 2002

(54) ROLLING BEARING

(75) Inventors: Hiromichi Takemura, Yokohama; Yasuo Murakami, Hadano; Kazuo Sekino, Ashigarakami-gun, all of (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/601,792
(22) PCT Filed: Nov. 19, 1999
(86) PCT No.: PCT/JP99/06463
§ 371 Date: Aug. 8, 2000
§ 102(e) Date: Aug. 8, 2000
(87) PCT Pub. No.: WO00/37701
PCT Pub. Date: Jun. 29, 2000
(51) Int. Cl.$^7$ ............................................. F16C 33/62
(52) U.S. Cl. ......................................................... 384/492
(58) Field of Search .................................. 384/492, 625, 384/565, 569, 493

(56) References Cited

U.S. PATENT DOCUMENTS

| 5,085,733 A | 2/1992 | Mitamura ..................... 148/319 |
| 5,908,515 A | 6/1999 | Goto et al. .................... 148/334 |

FOREIGN PATENT DOCUMENTS

| JP | 3-82736 | 4/1991 |
| JP | 4-165048 | 6/1992 |
| JP | 5-179404 | 7/1993 |
| JP | 7-188857 | 7/1995 |
| JP | 11-51065 | 2/1999 |
| JP | 11-80897 | 3/1999 |

OTHER PUBLICATIONS

Standard Test Method for measurement of Fatigue Crack Growth Rates, ASTM Designation E 647–95a, Dec. 1995, pp. 577–613.

Primary Examiner—Lenard A. Footland
(74) Attorney, Agent, or Firm—Crowell & Moring LLP

(57) ABSTRACT

A rolling bearing 1 in which a plurality of rolling elements 4 are disposed between bearing rings comprising a fixed ring 2 and a rotational ring 3 intended for prolonging the rolling life of a rolling bearing used at high temperature, large vibrations and heavy load such as in engine auxiliaries, wherein a tempering treatment is applied after quenching to at least one of the fixed ring 2 or the rotational ring 3 containing: C=0.65–1.25%, Si=0.7–2.5%, Cr=0.5–3.0% and containing at least one of: Mo=0.5–3.0% and Ti=0.05–0.5%, to dispersingly precipitate Mo type carbides or Ti type carbide of 50 to 300 nm size finely, to obtain a hydrogen trapping effect with the Mo type or Ti type carbides at the rolling surface thereby suppressing and preventing intrusion of hydrogen in the vicinity of the maximum shearing stress position, as well as suppressing and preventing occurrence and extension of fine initial cracks by the dispersing precipitation of the fine Mo type carbides.

34 Claims, 5 Drawing Sheets

ROLLING BEARING

TECHNICAL FIELD

The present invention relates to a rolling bearing used under high temperature conditions and, more in particular, it relates to a rolling bearing suitable to engine auxiliaries such as alternators, solenoid clutches, intermediate pulleys, compressors for vehicle air conditioners and water pumps.

BACKGROUND ART

Along with downsizing and weight reduction of automobiles in recent years, higher performance and higher power as well as down-sizing and weight reduction have been demanded also for the engine auxiliaries. For example, during operation of an engine, high temperature, large vibrations and heavy load (about 4G to 20G as gravitational acceleration) caused by high speed rotation exert simultaneously by way of a belt to bearings for use in an alternator. As a result, flaking occurs in an early stage to the rolling bearing, particularly, to an outer ring as a fixed ring and this tends to shorten the bearing life.

The prior art intended for the improvement of the life of bearings used under large vibrations and heavy load includes, for example, Japanese Examined Patent Publication No. Hei 7-72556 (hereinafter also referred to as prior art 1), Japanese Patent No. 2724019 (hereinafter also referred to as prior art 2), Japanese Unexamined Patent Publication No. Sho 62-218542 (hereinafter also referred to as prior art 3) and Japanese Unexamined Patent Publication No. Hei 2-190615 (hereinafter also referred to as prior art 4). Among them, the prior art 1 discloses that plastic deformation due to the decomposition of residual austenite under the raceway surface can be prevented by defining the amount of residual austenite in the outer ring of the bearing to 0.05% or more and 6% or less at least on the side of load input, that is, on the side of the pulley. Further, the prior art 2 discloses a heat resistant bearing steel of a composition comprising 0.8 to 1.5% C, 0.8 to 2.0% Si, 0.3 to 2.0% Mn, 1.3 to 1.98% Cr and 0.3 to 1.0% Mo, the total of Si and Mo being within a range of satisfying 1.0% or more, and the residue of Fe and impurities. Further, the prior art 3 discloses that the bearing ring contains 0.95 to 1.10% C, 1 to 2% Si, 1.15% or less of Mn, 0.90 to 1.50% Cr, and 8% or less of the amount of residual austenite, and has a surface hardness HRC of 60 or more. Further, the prior art 4 discloses a grease-sealed bearing having grease sealed in the bearing, in which an oxide layer of 0.1 to 2.5 μm thickness is formed on the rolling surface of the bearing ring of the bearing.

By the way, as a countermeasure for preventing early flaking in a bearing used under high temperature, large vibrations and heavy load caused by high speed rotation, [SAE Technical Paper: SAE 950944 (held in Feb. 27–Mar. 2, 1995)] describes in first to 14th sections that early flaking can be prevented by analyzing the fatigue mechanism of the bearing for use in the alternator, and replacing the sealing grease from E grease to M grease having a higher damper effect thereby absorbing large vibrations, heavy load and moderating metal contacting.

For the early flaking phenomenon, it is considered that water contained in a lubricant (sometimes contained, for example, usually by about 0.1% in grease) is decomposed and created hydrogen ions are adsorbed to the raceway surface, and accumulated as hydrogen atoms to a high strain area (near the maximum shearing stress position), which lead to stress corrosion cracking flaking. Further, for the cause of the formation of the water contained in the bearing, it is considered that since the auxiliary is heated to a high temperature during operation of an engine and cooled to an atmospheric temperature after stopping the engine, air presenting in a slight space of the bearing is condensed.

On the contrary, it is disclosed in the prior art 1 that tempering (at 250 to 380° C.) is conducted such that the mount of residual austenite at least in the outer ring on the side of the pulley is from 0.05 to 6%. However, mere decreasing in the amount of residual austenite can provide an effect for the improvement of the dimensional stability under a high temperature circumstance but this can only suppress the plastic deformation under the raceway surface for the flaking resistance and since sliding of the rolling element increases under large vibration, heavy load, the effect of prolonging the life is not recognized in a circumstance where hydrogen intrudes from the raceway surface.

Further, the prior art 2 also discloses that a hardness capable of withstanding the rolling contact fatigue can be maintained even during use at high temperature by adding an element of increasing the resistance to temper softening such as Si or Mo but macro carbide precipitates such as C—Cr tend to be formed to remarkably worsen the crack extension characteristic since C is contained up to 1.5% and Cr is contained by 1.3 to 1.98%. Further, no life extend effect can be expected by merely adding Mo by a small amount as 0.1 to 1.0%, since this can not precipitate fine Mo type carbides for improving the lower limit amplitude value of stress intensity factor.

Further, in the prior art 3, since the amount of residual austenite is decreased to 8% or less by high temperature tempering with addition of an element of improving the resistance to temper softening of steel such as Si or Al, a bearing ring with less dimensional aging change under a high temperature circumstance can be provided. However, for the flaking resistance, since sliding of a rolling element increases under large vibration, heavy load, the effect of prolonging the life can not be recognized under a circumstance where hydrogen intrudes from the raceway surface.

Further, in the prior art 4 since a troublesome treatment of dipping a bearing ring in an aqueous solution of sodium hydroxide under heating at a low temperature is necessary for forming a tri-iron tetroxide layer (generally referred to as a black coating) and, further, a treatment of corroding the rolling surface to such an extent as causing coloration in an aqueous oxidizing solution such as alcohol sulfate, hydrochloric acid or sulfuric acid as other solvent it involves problems, for example, in view of the facility or the processing time. Further, as shown in "Pretext for Conference of Japan Triopology (Tokyo, 1995-5) p 551–554", in a bearing for use in engine auxiliaries used under large vibrations/heavy load, since auto-rotation slip is caused at the inlet of a fixed ring, oxide layers capable of providing a damper effect are ruptured and a load exerts directly on the outer ring frequently suffering from early flaking, so that it is actually difficult to prevent early flaking in the fixed ring.

Further, when a bearing is heated in air without controlling the temperature, scales of several μm (skins) are formed on the surface of the material by oxidation. Unevenness of the scales causes loss of metal to possibly form initiation points for pits. Further, when the bearing is merely left in atmospheric air, it may be considered that steels react with moisture in air to possibly cause atmospheric corrosion.

Further, the rolling contact fatigue is a phenomenon caused by shearing stress and vertical compressive stress synthesized under the rolling surface, and cracks are extended also in a synthesized mode of a tensile crack extension mode (mode I) and a shearing crack extension mode (mode II). Accordingly, for determining crack extension characteristic data for bearing materials, a study on bearing materials excellent in crack extension resistance characteristic has also been conducted, for example, by conducting a crack extension test using a compression/tensile (CT) test piece by a test method according to ASTM E 647-83.

The present invention has been developed in order to solve the foregoing problems and it is an object thereof to provide a rolling bearing used under a high temperature circumstance at 150° C. or higher, preferably, 180° C. or higher as in engine auxiliaries, by dispersingly precipitating Mo type or Ti type carbides of 50 to 300 nm finely on the surface of a bearing ring to obtain a hydrogen trapping effect, thus enabling to prevent hydrogen from intruding to the vicinity of a maximum shearing stress position where a rolling contact fatigue is greatest, thereby increasing the effect of prolonging the rolling life under high temperature, large vibrations and heavy load, or enabling to improve a lower limit amplitude value of the stress intensity factor by a pinning effect of Mo type carbides of 50 to 300 nm size described above, thereby suppressing extension of fine initial cracks.

DISCLOSURE OF THE INVENTION

For attaining the object, a rolling bearing in accordance with the present invention has a feature in which a plurality of rolling elements are disposed and used between bearing rings comprising a fixed ring and a rotational ring of a rolling bearing, wherein at least one of the bearing rings contain: C=0.65–1.25%, Si=0.7–2.5%, and Cr=0.5–3.0%, and contains at least one of: Mo=0.5–3.0% and Ti=0.05–0.5% in which Mo type carbides or Ti type carbides with an average grain size of 50 to 300 nm are dispersingly precipitated finely. Then, hydrogen deleterious in the lowering of the life is fixed only at the rolling surface and can be prevented from intruding as far as the maximum shearing stress position to obtain an effect of prolonging the rolling life by the hydrogen trapping effect of the Mo type or Ti type carbides in the constitution. Further, the lower limit amplitude value of stress intensity factor is improved by the pinning effect of the fine Mo type carbides in the constitution to obtain an effect of suppressing the extension of initial fine cracks thereby retarding progress to flaking and prolonging the rolling contact fatigue life.

Among them, C is an element for providing a hardness required as a rolling bearing, in which a hardness HRC 58 or more required for the rolling bearing can not sometimes be ensured if it is less than 0.65% and, on the other hand, if it is contained in excess of 1.25%, precipitated carbides tend to become huge to sometimes deteriorate the contact fatigue life and resistance to impact load, so that it is defined as: C=0.65–1.25%.

Further, Si is an element improving the retardation for the change of tissue, hardenability and resistance to temper softening but the effect is not sufficient if it is less than 0.7%, whereas the machinability is remarkably deteriorated if it exceeds 2.5%, so that it is defined as: Si=0.7–2.5%.

Further, Cr is an element improving the hardenability and promoting the sphericalization of carbides and it is necessary to be incorporated by at least 0.5% or more, preferably, 1% or more. However, C—Cr type carbides sometimes become coarser to increase the average crystal grain size and deteriorate the machinability if it is incorporated in excess of 3.0% and, particularly, the average grain size of the carbides tends to increase to lower the amplitude value of stress intensity factor if it exceeds 1.15%, so that it is defined as Cr=0.5–1.15%.

Mo is an element improving the bearing hardness and also improving high temperature strength due to the resistance to temper softening and the dispersing effect of fine carbides and it is necessary by 0.5% or more. However, since the effect is saturated and the machinability is possibly deteriorated rather if it exceeds 3.0%, it is defined as Mo=0.5–3.0%. Further, the number of dispersed precipitates of the Mo type carbides is preferably 10 or more per 10 $\mu m^2$. Further, the grain size of the Mo type carbides at 50 to 300 nm is controlled by adding Mo by 1.1% or more and applying a solid solution treatment, and they can be increased to 20 or more per 10 $\mu m^2$. Further, since the dispersing precipitation effect has a function of improving the amplitude value of the stress intensity factor, it is preferably defined as: Mo=1.1 to 3.0%.

Ti is an element finely dispersing in the form of Ti carbides and Ti carbonitrides to improve the hardness and the rolling life of a bearing and suppressing growing of austenitic crystal grains during quenching and it has also an effect as a hydrogen trap. However, if it is 0.05% or less, Ti nitride of 1 $\mu m$ or more is predominant and no refining effect can be expected. Further, if it exceeds 0.50%, machinability is lowered or the number of inclusions (TiN, TiS) that lowers the rolling life increases, so that the content is defined as: Ti =0.05–0.50%. Further, for fine dispersive precipitation of TiC and TiCN, it is preferred that a solution treatment is applied at 1150 to 1350° C. to control the size of precipitates.

Further, dispersive precipitates of Mo type or Ti type carbides of 50 to 300 nm are preferably by the number of 10 or more per 10 $\mu m^2$.

Further, referring to 0, it is desirably at 10 ppm or less in order to decrease the formation of oxide type inclusions. Also for S, it is preferably 0.02% or less with the same reason. For the amount of residual austenite, it is defined as 1% or less by tempering at a temperature of 400° C. or higher, considering the dimensional change due to decomposition of austenite, in a working circumstance at a high temperature of 150° C. or higher. Since the presence of austenite even by a small amount causes dimensional change, the amount of residual austenite is preferably 0% that causes no dimensional change. Those with no dimensional change after tempering at a temperature of 300° C. or higher were adopted as 0% content.

The surface of the bearing ring or the rolling element may be applied with an ordinary heat treatment, that is, a tempering treatment at 400 to 550° C. after quenching and a heat treatment may be applied again to 200–400° C. in air after grinding, to provide the surface hardness HRC 58 or more and the amount of residual austenite to 1% or less, and form an oxide layer comprising an iron oxide type materials of 5 to 100 nm (also referred to as re-heated oxide layer), thereby attaining a hydrogen intrusion inhibitive effect by the re-heated oxide layer, so as to prevent fracture of the layer formed with a lubricant on the raceway surface due to the effect of heavy load and large vibration, suppress intrusion of hydrogen caused by decomposition of the water content in the lubricant, thereby preventing stress corrosion cracking flaking and, further, prolonging the rolling life.

BEST MODE FOR PRACTICING THE INVENTION

A mode of practicing the present invention is to be described with reference to the drawings.

Figure 1:
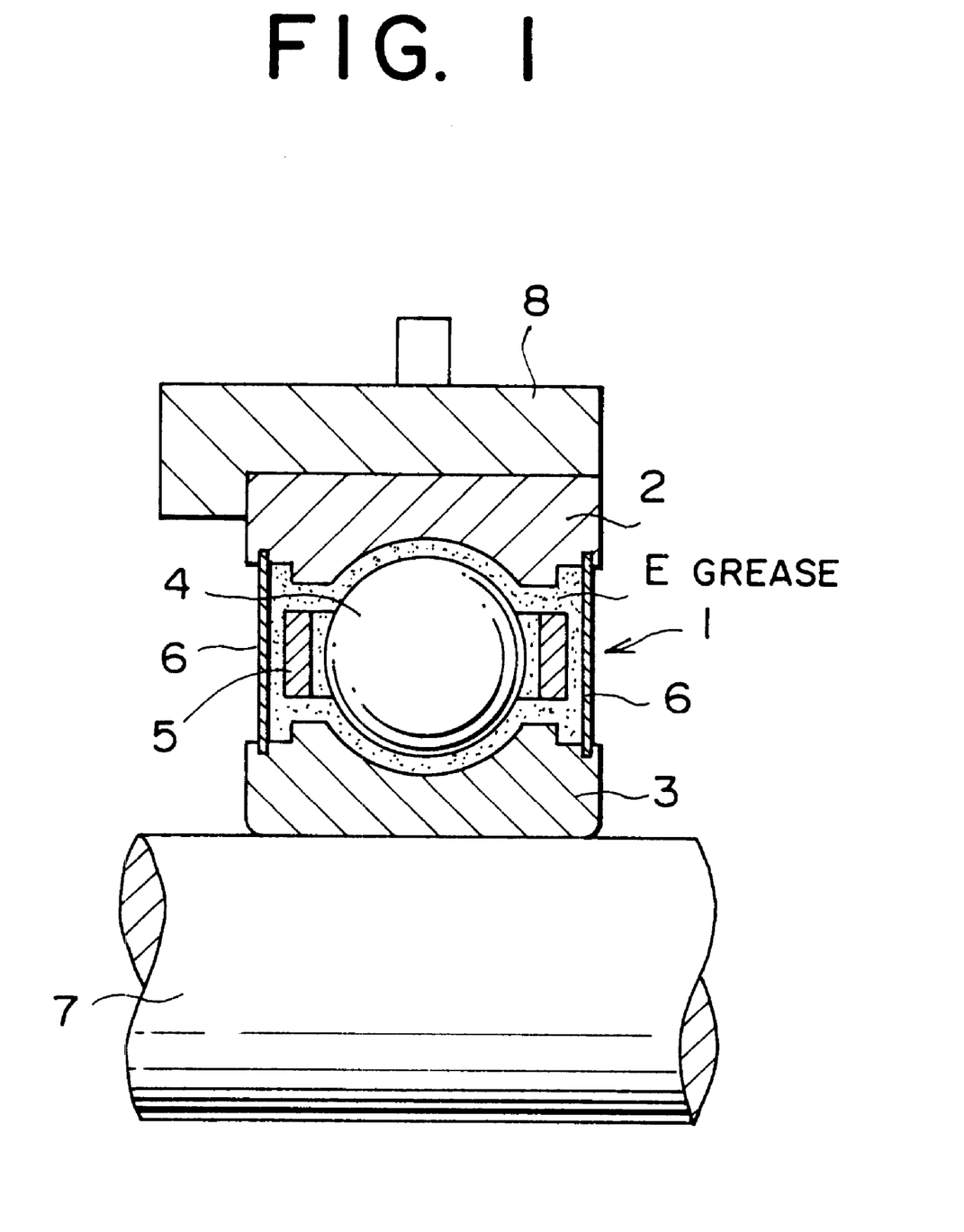
FIG. 1 is a cross sectional view for a main portion of one embodiment of a rolling bearing according to the present invention.

FIG. 1 is a cross sectional view for one embodiment of a rolling bearing applied with surface treatment according to the present invention. In the drawing, reference 1 denotes a deep groove ball bearing for inner ring rotation. In the illustrated rolling bearing 1, an outer ring 2 is fixed to a housing 8 and an inner ring 3 is assembled into a shaft 7. A plurality of rolling elements 4 held by cages 5 are disposed between the outer ring 2 and the inner ring 3. Openings between the outer ring 2 and the inner ring 3 situated on both sides of the cage 5 are fitted and capped with seal members 6. E grease is sealed in a space surrounded with the seal members 6, the outer ring 2 and the inner ring 3. Then, the inner ring 3 rotates along with rotation of the shaft 7, and vibrations/load caused by the rotation exert from the shaft 7 by way of the inner ring 3 and the rolling element 4 to a loaded area of the outer ring 2.

The outer ring 2 and the inner ring 3 of the rolling bearing 1 were prepared from the materials shown in an appended table for the subsequent life test, by applying a heat treatment also shown in the appended table. Further, a steel ball of a high temperature design having HRC 58 or more made of SUJ-2 tempered at 240° C. was used for the rolling element 4. The surface hardness was HRC 58 or more and the amount of residual austenite was 2% or less for each of the inner and outer rings and the rolling element corresponding to the example, and the surface roughness was 0.01 to 0.04 μm Ra for the inner and outer rings and the surface hardness of the rolling element was 0.03 to 0.010 μm Ra both in the examples and the comparative examples.

Further, in a portion of the rolling bearings 1 in the examples according to the present invention, a heat oxidation treatment is applied, for example, to the outer ring 2 and the inner ring 3 before assembling, at a temperature of 200 to 400° C. for several minutes in air, divisionally, by once to three times. This heating is referred to as re-heating oxidizing treatment. A layer of iron-chromium oxide type (oxide layer) of 5 to 100 nm is formed on each of raceway surfaces of the outer ring and the inner ring by the re-heating oxidizing treatment. Subsequently, grease is sealed in the assembled rolling bearing 1 to obtain a rolling bearing.

While the Mo type or Ti type carbides function as a hydrogen trap near the surface, this oxide layer suppresses and prevents intrusion of hydrogen itself created, for example, by decomposition of water. Accordingly, if the thickness of the oxide layer is less than 5 nm, it can not prevent the intrusion of the created hydrogen completely, leading to stress corrosion cracking flaking. Further, if the thickness of the oxide layer exceeds 100 nm, it forms brittle oxide scales to worsen the surface roughness and frequently forms pits on the surface as the initiation points for flaking.

The re-heating oxidizing treatment may be applied to all of the outer ring 2, the inner ring 3 and the rolling element 4 as constituent components of the rolling bearing or may be applied selectively to one or two members thereof. Further, if the treatment is applied to the outer ring 2 and the inner ring 3 as the bearing ring, it may be applied to the entire surface or at least only on the raceway surface of the bearing ring.

"Comparison Test" conducted for the rolling bearing of the examples according to the present invention and the rolling bearing of the comparative examples is to be described.

COMPARATIVE TEST 1

Figure 2:
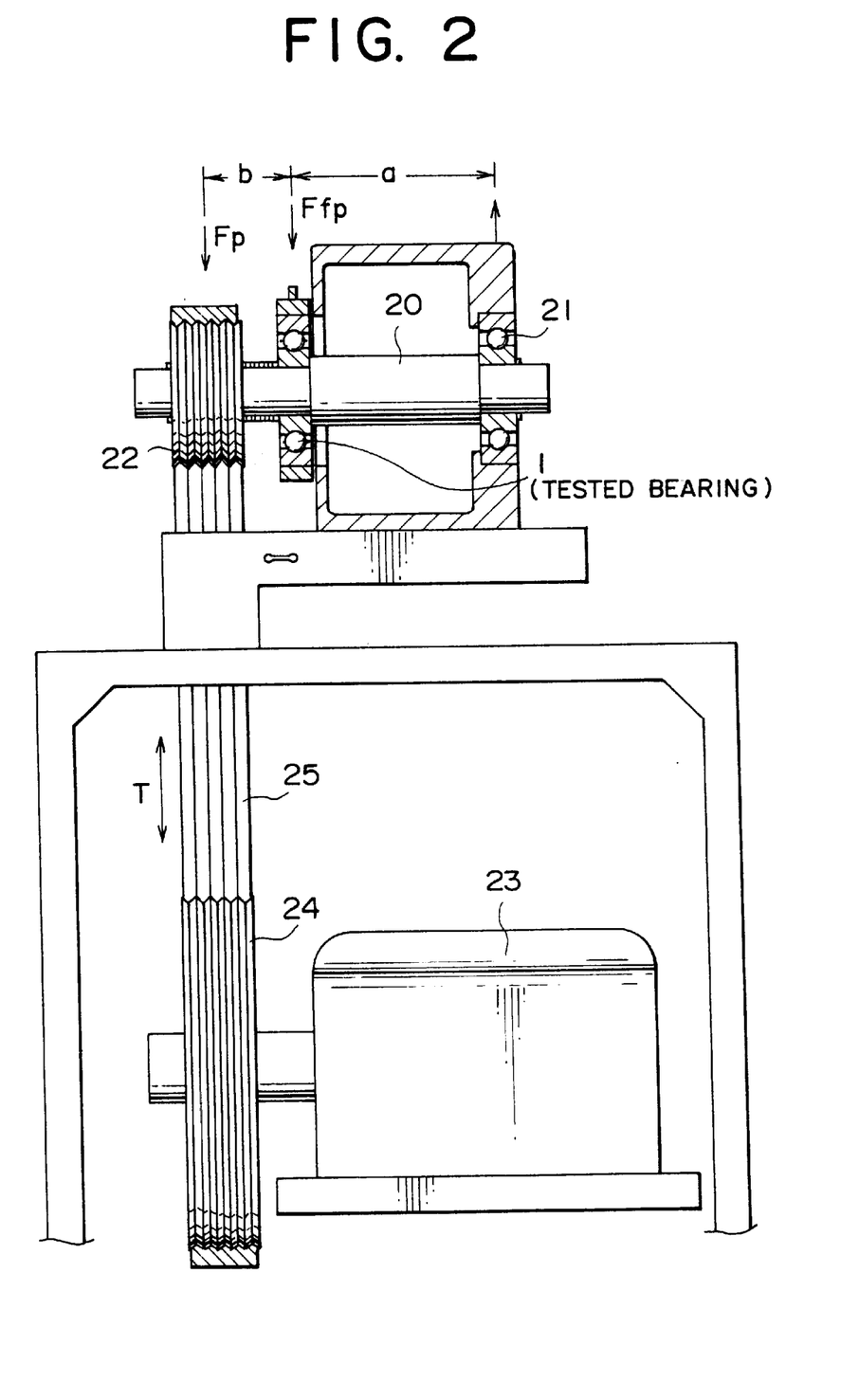
FIG. 2 is a schematic view for an example of a life testing equipment for a roll bearing.

Life Test for High Speed Rotation under High Temperature 1-1: Test Equipment and Method A testing equipment shown in FIG. 2 was used. The testing equipment is a rapid acceleration/deceleration testing equipment disclosed in Japanese Unexamined Patent Publication No. No. 9-89724 previously proposed by the present applicant, which can switch the number of rotation on every predetermined time (for example, on every 9 sec) between 9000 rpm and 18000 rpm. In the drawing, identical reference numerals with those in the publication are attached, with detailed descriptions for the structure being omitted. The rapid acceleration/deceleration testing equipment can conduct test while simulating the life of the tested bearing 1 to a state of actual operation being incorporated in an engine auxiliary or the like. Further, during rotational driving, atmospheric water content is absorbed in the grease sealed in the tested bearing 1. As described above, according to this rapid acceleration/deceleration testing equipment, since the tested bearing 1 can be set in a state according to an actual state of use, a highly reliable life test can be conducted while setting the load applied or the rotational speed to those values corresponding to the actual state of use. In the test, a heater is disposed around the tested bearing 1 and the test was conducted at a constant temperature of 150° C. Further, the load condition in this test was set as P (load applied)/C (dynamic rated load)=0.10. Further, the calculated life of the tested bearing 1 in this case was 1350 hr and, accordingly, the test termination time was 1500 hr. The number of test was n =10 in each case.

1-2: Tested Bearing

Various factors of the rolling bearing as the test specimens used for the life test were those of JIS bearing number 6303. Further, the ingredient, tempering temperature and the amount of residual austenite ($\gamma_R$) of the inner ring, the outer ring and the rolling element of the rolling bearing used as the test specimen are shown in Table 1.

TABLE 1

| | | Chemical Ingredient (%) | | | | | Tempering temp. | γ R (%) | Remarks |
|---|---|---|---|---|---|---|---|---|---|
| | | C | Si | Cr | Mo | Ti | | | |
| Example | 1 | 0.65 | 2.50 | 0.63 | — | 0.5 | 400° C. | 0.2 | |
| | 2 | 0.84 | 1.03 | 1.51 | 1.0 | — | 400° C. | 0.5 | |
| | 3 | 0.78 | 0.74 | 3.00 | 0.5 | 0.3 | 450° C. | 2.0 | |
| | 4 | 0.80 | 1.15 | 1.56 | 1.0 | 0.05 | 450° C. | 0.0 | |
| | 5 | 0.97 | 0.98 | 1.49 | 0.5 | — | 500° C. | 0.0 | |
| | 6 | 0.86 | 2.09 | 0.78 | 2.0 | — | 500° C. | 0.5 | |
| | 7 | 1.10 | 0.70 | 0.50 | — | 0.2 | 550° C. | 0.0 | |
| | 8 | 1.00 | 0.84 | 1.45 | 1.0 | 0.1 | 550° C. | 0.0 | |
| | 9 | 0.65 | 1.05 | 1.47 | 1.0 | — | 400° C. | 0.7 | Reheated layer |
| | 10 | 0.85 | 1.05 | 1.41 | — | 0.3 | 450° C. | 0.5 | ↑ |
| | 11 | 1.05 | 1.05 | 1.56 | 0.5 | 0.2 | 500° C. | 0.0 | ↑ |
| | 12 | 0.80 | 0.92 | 0.78 | 2.0 | — | 550° C. | 0.0 | ↑ |
| Comp. Example | 1 | 1.00 | 0.15 | 1.49 | — | — | 280° C. | 2.8 | SUJ2 |
| | 2 | 1.05 | 1.00 | 1.45 | — | — | 260° C. | 3.0 | 1% Si |
| | 3 | 0.98 | 0.27 | 1.55 | — | — | 180° C. | 6.0 | Black coating |
| | 4 | 0.84 | 0.54 | 1.44 | 1.0 | — | 400° C. | 0.7 | |
| | 5 | 0.55 | 0.98 | 0.95 | — | 0.2 | 400° C. | 1.2 | |
| | 6 | 0.78 | 1.54 | 0.31 | 0.5 | — | 450° C. | 0.0 | |
| | 7 | 0.95 | 0.89 | 1.37 | — | 0.7 | 450° C. | 0.5 | |
| | 8 | 0.80 | 1.51 | 0.90 | — | — | 350° C. | 1.7 | Reheating treatment |
| | 9 | 1.06 | 0.98 | 1.60 | — | — | 350° C. | 0.5 | Reheating treatment |

Each of Examples 1 to 12 is for the rolling bearing according to the present invention which contains: C=0.65–1.25% (recommended value: 0.65–1.10%), Si =0.7–2.5%, Cr=0.5–3.0% (recommended value: 0.5–1.15%), containing at least one of: Mo=0.5–3.0% (recommended value: 1.1–3.0%) and Ti=0.05–0.5%, which is applied with a tempering treatment at 400° C. or higher and satisfies the condition that the amount of residual austenite is 2% or less. Further, for Examples 9 to 12, the re-heating layer treatment described above was applied to form an oxide layer of 5 to 100 nm thickness on the raceway surface.

On the other hand, Comparative Example 1 corresponds to the prior art example 1 in which each of the Si, Mo, Ti contents, the tempering temperature and the amount of residual austenite ($\gamma_R$) are different from those of the present invention. Further, Comparative Example 2 corresponds to the prior art example 3 in which each of the Mo, Ti contents, the tempering temperature and the amount of residual austenite ($\gamma_R$) are different from those of the present invention. Further, Comparative Example 3 corresponds to the prior art example 4 in which each of the Si, Mo, Ti contents, the tempering temperature and the amount of residual austenite ($\gamma_R$) are different from those of the present invention and, in addition, black coating described above was applied. Further, each of Comparative Examples 4 to 7 is different regarding each of the Si, C, Cr and Ti contents from those in the present invention. Further, Comparative Examples 8, 9 are different from the present invention regarding each of the Mo, Ti contents and, in addition, the thickness of the oxide layer formed by changing conditions for the re-hating layer treatment was made different from that of the present invention.

1-3: Test Result

Table 2 shows, as a test result, the evaluation time (bearing life) and presence or absence of flaking (damage), as well as the size of Mo, Ti type carbides, the thickness of the oxide layer, the surface hardness and the factors for the conditions of re-heating layer treatment on each of the test specimens.

TABLE 2

| | | Mo—Ti type carbides size (nm) | Layer thickness (nm) | Surface hardness (HRC) | Re-heating layer treatment | Evaluation time (hr) | Absence or presence of flaking |
|---|---|---|---|---|---|---|---|
| Example | 1 | 95 | — | 59 | — | 1500 | no |
| | 2 | 150 | — | 62 | — | 1500 | no |
| | 3 | 300 | — | 58 | — | 1304 | flaking in 1/10 of outer ring |
| | 4 | 205 | — | 63 | — | 1500 | no |
| | 5 | 275 | — | 59 | — | 1395 | flaking in 1/10 of outer ring |
| | 6 | 80 | — | 60 | — | 1500 | no |
| | 7 | 50 | — | 59 | — | 1400 | flaking in 1/10 of outer ring |
| | 8 | 85 | — | 61 | — | 1500 | no |
| | 9 | 50 | 20 | 61 | 300° C. × 20 min | 1500 | no |
| | 10 | 150 | 5 | 60 | 220 × 30 min | 1500 | no |
| | 11 | 75 | 50 | 59 | 260 × 60 min | 1500 | no |
| | 12 | 270 | 100 | 58 | 400° C. × 10 min | 1500 | no |
| Comp. Example | 1 | — | — | 56 | — | 104 | flaking in 10/10 of outer ring |
| | 2 | — | — | 61 | — | 131 | flaking in 10/10 of outer ring |
| | 3 | — | 2000 | 62 | — | 74 | flaking in 10/10 of outer ring |

TABLE 2-continued

| | Mo—Ti type carbides size (nm) | Layer thickness (nm) | Surface hardness (HRC) | Re-heating layer treatment | Evaluation time (hr) | Absence or presence of flaking |
|---|---|---|---|---|---|---|
| 4 | 295 | — | <u>55</u> | — | 487 | large vibration, and stopped in 10/10 |
| 5 | 10 | — | <u>57</u> | — | 250 | flaking in 10/10 of outer ring |
| 6 | 250 | — | <u>56</u> | — | 525 | flaking in 10/10 of outer ring |
| 7 | <u>1050</u> | — | 58 | — | 111 | flaking in 10/10 of outer ring |
| 8 | — | <u>0.5</u> | 58 | 170° C. × 60 min | 106 | flaking in 10/10 of outer ring |
| 9 | — | <u>1200</u> | 58 | 450° C. × 20 min | 168 | flaking in 10/10 of inner and outer ring |

Figure 3:
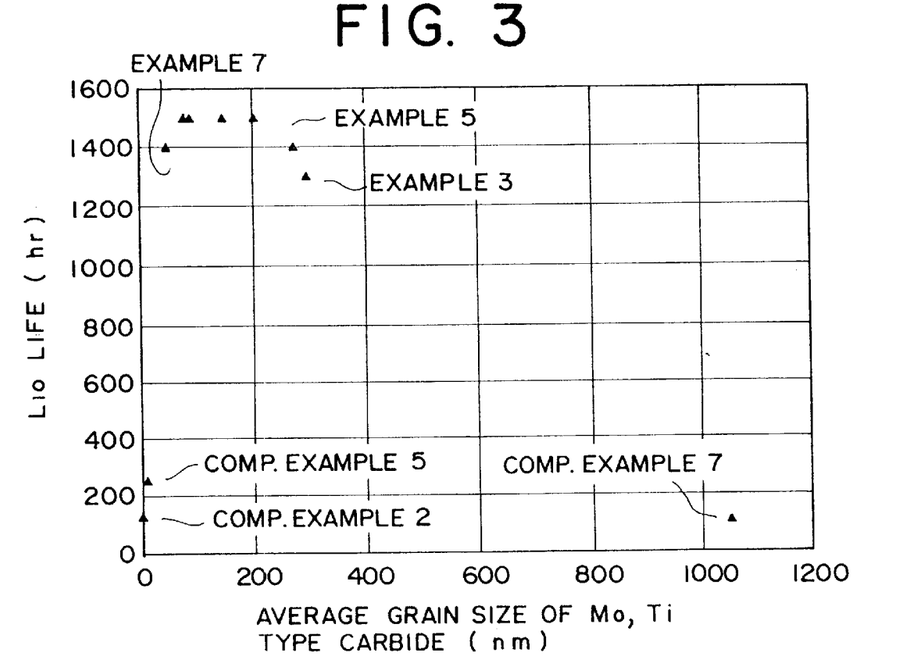
FIG. 3 is a graph showing a relationship between an average grain size of carbides and a bearing life.
Figure 4:
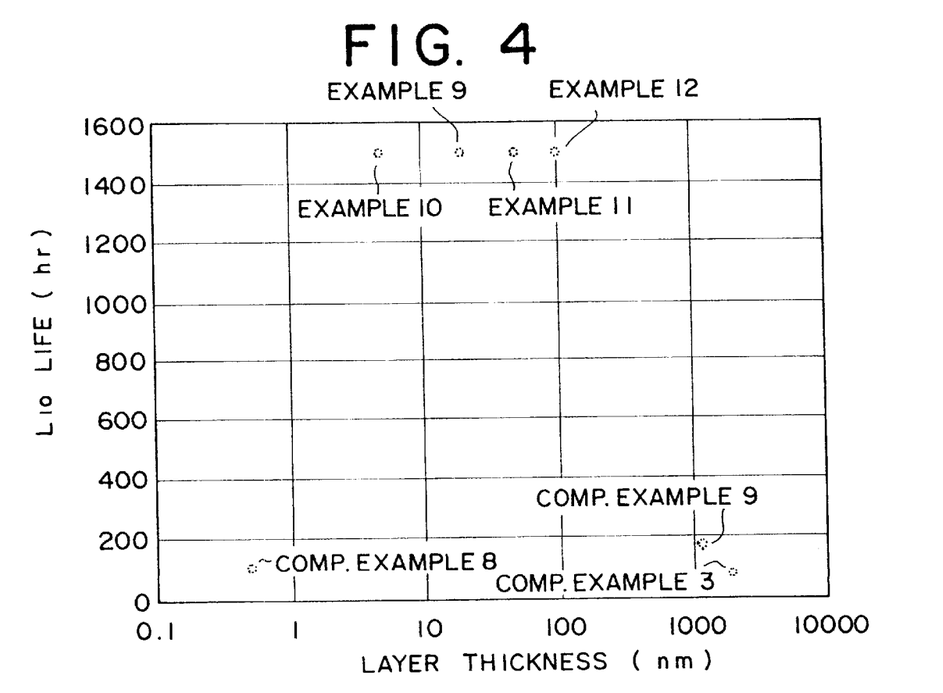
FIG. 4 is a graph showing a relationship between a thickness of an oxide layer and a bearing life.

Further, FIG. 3 shows a relationship between an average Ti or Mo type carbide grain size and an evaluation time (bearing life) for each of test specimens shown in Table 2 as a graph and FIG. 4 shows a relationship between an oxide layer thickness and an evaluation time (bearing life) for each of test specimens shown in Table 2 as a graph.

Among them, for Examples 1, 2, 4, 6, and 8, since the average grain size of the Mo type or Ti type carbides is 95, 150, 205, 80 and 85 nm and they are dispersingly precipitated in each of them, no flaking was caused even when the $L_{10}$ life reached 1500 hr. This is considered that intrusion of hydrogen atoms to the vicinity of the maximum shearing stress position under the rolling surface was prevented by the hydrogen trapping effect of fine carbides near the surface of the bearing ring.

Further, for each of Examples 3, 5, the average grain size of the Mo type or Ti type carbides was 300, 275 nm respectively, which was in the vicinity of the upper limit for the factors of the present invention and flaking was caused to the outer ring in one out of ten of the test specimens and the $L_{10}$ life was 1304 hr and 1395 hr for them. The bearing life in each of them was sufficiently longer as about 6 times or more than that of the comparative example but it is considered that since the test condition was at a high temperature of 150° C. and since the average grain size of the Mo type or Ti type carbides is relatively large, the number of precipitated carbides per unit volume was decreased, as a result, compared with that in other examples and the hydrogen trapping effect was lowered somewhat tending to diffuse the hydrogen atoms.

Further, for Example 7, the average grain size of Mo type or Ti type carbides was 50 nm which is the lower limit for the factor of the present invention, and flaking was caused to the outer ring in one out of ten of the test specimens and the $L_{10}$ life was 1400 hr. It is considered that the average grain size of the Mo type or Ti type carbides was smaller than that in other examples and the hydrogen trapping effect was lowered somewhat tending to diffuse the hydrogen atoms although the bearing life was sufficiently longer as about 6 times or more than that in the comparative example.

Further, for Examples 9 to 12, while the average grain size of the Mo type or the Ti type carbides was varied but flaking was not caused in each of them even when the $L_{10}$ life reached 1500 hr. It is considered to be attributable to the hydrogen intruding inhibitive effect by the oxide layer of 5 to 100 nm thickness described above in addition to the hydrogen trapping effect of the Mo type or Ti type carbide.

On the other hand, for Comparative Example 1, since a high temperature tempering treatment was applied for SUJ2 at 280° C., increasing of the vibration value or seizing due to dimensional change was not recognized also in a test circumstance at 150° C. However, since this was a bearing with no precipitation of fine carbides or with no iron oxide layer treatment, it could not prevent intrusion of hydrogen, since the bearing hardness was as low as HRC 56, it was not sufficient for rolling contact fatigue so that flaking was caused to the outer ring in 10 out of 10 specimens and the $L_{10}$ life was 104 hr, which was 1/13 or less of the calculated life. Comparative Example 2 was also a bearing with no precipitation of fine carbides or with no iron oxide layer treatment, so that intrusion of hydrogen can not be prevented. Further, since the bearing hardness is as high as HRC 61, although the resistant effect to plastic deformation caused by rolling contact fatigue can be expected but flaking was caused, as a result, to the outer ring in 10 out of 10 specimens and the $L_{10}$ life was 131 hr, which was 1/10 or less of the calculated life.

For Comparative Example 3 while a layer of 2000 nm could be formed on the surface of the bearing ring by applying black coating, the surface roughness was as large as 0.1 μm Ra and the vibrations increased, as well as the amount of residual austenite $\gamma_R$ was as high as 6%, so that under a high temperature of 150° C. for the condition of this test, vibrations were large in 10 out of 10 specimens due to the effect of the dimensional change caused by the decomposition of the austenite and the $L_{10}$ life was 74 hr and the test was terminated at 1/15 or less of the calculated life. Further, when the surface after the test was observed, fracture of the black coating layer was recognized and the effect of preventing hydrogen intrusion as in the oxide layer could not be expected.

For Comparative Examples 4, 6, while fine carbides were 295 and 250 nm, the bearing hardness was as low as HRC 55, 56, and the $L_{10}$ life was longer as 487, 525 hr, respectively, when compared with other comparative examples but was not sufficient when compared with each of the examples. Further, for Comparative Example 5, since the fine carbides were excessively small as 10 nm, no sufficient hydrogen trapping effect could be obtained and since the bearing hardness was as low as HRC 57, flaking was caused to the outer ring in 10 out of 10 specimens and the $L_{10}$ life was 250 hr, which was about 1/5 of the calculated life. Further, for Comparative Example 7, since the amount of Ti was as high as 0.7%, fine TiC capable of trapping hydrogen was not precipitated but large inclusions TiN of 1050 nm were formed on the surface, flaking was caused to the outer ring in 10 out of 10 specimens and the $L_{10}$ life was 111 hr.

For Comparative Example 8, since the iron oxide layer thickness was as small as 0.5 nm, the layer on the raceway surface was completely fractured after the test, flaking was caused to the outer ring in 10 out of 10 specimens and the $L_{10}$ life was 106 hr, which was 1/13 of the calculated life. Further, for Comparative Example 9, although an oxide layer of 1200 nm was formed on the raceway surface, it formed scales to embrittle the raceway surface and a lot of pits are formed on the surface. Further, flaking portions were present both in the inner ring and the outer ring together. Therefore, flaking was caused at the pit initiation points and the $L_{10}$ life was as short as 168 hr.

From the foregoing results, the hydrogen trapping effect can be obtained by dispersingly precipitating fine Mo type or Ti type carbides of 50 to 300 nm on the rolling surface under large vibrations/heavy load, thereby enabling to prevent intrusion of hydrogen to the vicinity of the maximum shearing stress position where the rolling contact fatigue stress is greatest, to expect the effect of prolonging the rolling life. Further, by forming iron chromium oxide type layer (re-heating oxidized layer) of 5 to 100 nm on the bearing surface, it is possible to suppress stress corrosion cracking flaking caused by intrusion of hydrogen created by decomposition of several % of water content contained in a lubricant.

Then, descriptions are to be made to a fatigue cracking extension test.

COMPARATIVE TEST 2

Compression/Tensile Test 2-1 Test Specimen

Figure 5:
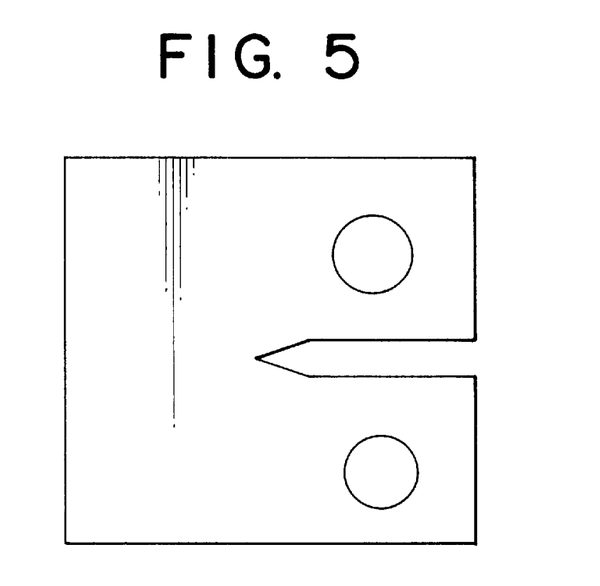
FIG. 5 is an explanatory view for a compression/tensile test piece.

At first, a compression/tensile (CT) test specimen shown in FIG. 5 was prepared with chemical ingredients for Example 13 to Example 20 and Comparative Example 10 to Comparative Example 14 among those shown in Table 3. In each of the test specimens, after the heat treatment, the surface hardness was HRC 55 to 63 and the amount of residual austenite ($\gamma_R$) was 0 to 6%. Each of Examples 13 to 20 is for the rolling bearing according to the present invention, which contains: C=0.65–1.25% (recommended value: 0.65 to 1.10%), Si=0.7 to 2.5%, Cr=0.5 to 3.0% (recommended value: 0.5 to 1.15%), and contains at least: Mo=0.5 to 3.0% (recommended value: 1.1 to 3.0%), which is applied with a tempering treatment at 300° C. to 450° C. to satisfy the condition that the amount of residual austenite is 1% or less and, preferably, 0%. On the other hand, Comparative Example 10 is different from the present invention regarding each of Si, Mo contents and is different from the recommended value of the present invention regarding the Cr content, the tempering temperature and the amount of residual austenite ($\gamma_R$). Further, Comparative Example 11 is different from the recommended values of the present invention, regarding each of the Cr, Mo contents and the amount of residual austenite ($\gamma_R$). Further, Comparative Example 12 is different from the present invention regarding the Mo content. Further, each of Comparative Examples 13, 14 is different from present invention regarding each of Si, C contents. Comparative Example 13 is different from the recommended value of the present invention regarding the Mo content.

TABLE 3

| | | Chemical Ingredient (%) | | | | | Tempering temp. | $\gamma_R$ (%) | Remarks |
|---|---|---|---|---|---|---|---|---|---|
| | | C | Si | Mn | Cr | MO | | | |
| Example | 13 | 1.08 | 1.10 | 0.50 | 1.12 | 1.3 | 300° C. | 0 | |
| | 14 | 0.65 | 2.50 | 0.35 | 0.98 | 1.1 | 300° C. | 0 | |
| | 15 | 0.78 | 0.74 | 0.21 | 1.05 | 3.0 | 350° C. | 0 | |
| | 16 | 0.80 | 1.15 | 0.78 | 0.78 | 1.5 | 350° C. | 0 | |
| | 17 | 0.97 | 0.98 | 0.17 | 1.15 | 1.2 | 400° C. | 0 | |
| | 18 | 0.86 | 2.09 | 0.30 | 1.06 | 1.3 | 400° C. | 0 | |
| | 19 | 1.25 | 0.70 | 0.42 | 0.68 | 2.1 | 450° C. | 0 | |
| | 20 | 1.00 | 1.08 | 1.15 | 0.50 | 1.8 | 450° C. | 0 | |
| | 21 | 0.75 | 1.05 | 0.43 | 0.98 | 1.2 | 300° C. | 0 | Reheated layer |
| | 22 | 0.85 | 1.21 | 0.64 | 1.10 | 2.0 | 350° C. | 0 | ↑ |
| | 23 | 1.04 | 1.05 | 0.38 | 1.06 | 1.2 | 400° C. | 0 | ↑ |
| | 24 | 0.81 | 0.98 | 0.46 | 0.78 | 2.9 | 450° C. | 0 | ↑ |
| Comp. Example | 10 | 1.00 | 0.35 | 0.34 | 1.49 | — | 250° C. | 3.8 | |
| | 11 | 1.05 | 1.00 | 0.49 | 1.45 | 1.0 | 300° C. | 0 | |
| | 12 | 0.98 | 1.27 | 0.39 | 1.05 | — | 300° C. | 0 | |
| | 13 | 0.84 | 0.44 | 0.25 | 0.85 | 0.9 | 300° C. | 0 | |
| | 14 | 0.51 | 0.98 | 0.56 | 1.10 | 1.2 | 300° C. | 0 | |
| | 15 | 1.38 | 1.05 | 0.87 | 0.49 | 1.8 | 300° C. | 1.0 | |
| | 16 | 0.95 | 0.84 | 0.34 | 1.07 | 0.6 | 350° C. | 0 | |
| | 17 | 0.80 | 1.50 | 0.49 | 1.51 | — | 250° C. | 4.6 | Reheating treatment |
| | 18 | 1.06 | 0.98 | 0.50 | 0.91 | — | 350° C. | 0 | Reheating treatment |

2-2 Test Method

Using such test specimens of the examples and the comparative examples, a test was conducted in accordance with ASTM E 647-83, at a test temperature of 180° C., test load ΔP =675 kgf, frequency of 30 to 1 Hz and stress ratio R=−1. The stress ratio R is a stress ratio between tensile and compression stresses and −1 means that the amplitude is equal between compression and tension.

2-3: Test Result

The results of the test are shown in Table 4. $\Delta K_{Ith}$ (MPam$^{1/2}$) in the table is a lower limit amplitude value of the stress intensity factor and shows that as the value is greater, cracking is less to extend in the initial stage. As a result, in Examples 13–20, the lower limit amplitude value of stress intensity factor $\Delta K_{Ith}$(MPam$^{1/2}$) is larger as the average grain size of the Mo type carbide is smaller. For example, in Example 15, the lower limit amplitude value of stress intensity factor $\Delta K_{Ith}$ was 12.1 (MPam$^{1/2}$) when the average grain size of the Mo type carbide was 50 nm and the lower limit amplitude value of stress intensity factor $\Delta K_{Ith}$ was 7.6 (MPam$^{1/2}$) when the average grain size of the Mo type carbide was 300 nm as in Example 14.

TABLE 4

Result of Fatigue Crack Test

|  |  | Average grain size of Mo type carbide (nm) | Surface hardness HRC | $\Delta K_{Ith}$(MPam$^{1/2}$) |
|---|---|---|---|---|
| Example | 13 | 106 | 61 | 8.9 |
|  | 14 | 300 | 59 | 7.6 |
|  | 15 | 50 | 59 | 12.1 |
|  | 16 | 148 | 60 | 8.2 |
|  | 17 | 245 | 58 | 7.8 |
|  | 18 | 211 | 60 | 7.9 |
|  | 19 | 64 | 57 | 10.8 |
|  | 20 | 79 | 56 | 10.5 |
| Comp. | 10 | — | 58 | 5.8 |
| Example | 11 | 475 | 60 | 6.1 |
|  | 12 | — | 59 | 5.9 |
|  | 13 | 510 | 56 | 6.2 |
|  | 14 | 250 | 54 | 8.2 |

On the contrary, in a case where no Mo type carbides are contained as in Comparative Examples 10, 12, the lower limit amplitude value of stress intensity factor $\Delta K_{Ith}$ (MPam$^{1/2}$) was as small as 5.8 (MPam$^{1/2}$) and 5.9 (MPam$^{1/2}$) respectively. Further, even when Mo type carbides are contained, if the average grain size was as large as 475 nm, 510 nm respectively different from that in the present invention as in Comparative Examples 11, 13, the lower limit amplitude value of stress intensity factor $\Delta K_{Ith}$ (MPam$^{1/2}$) was about 6.1 (MPam$^{1/2}$) and 6.2 (MPam$^{1/2}$), respectively and no particular effect is obtained compared with Comparative Examples 1, 3. Further, in Comparative Example 14, while the surface hardness was as low as HRC 54, since the average grain size of the Mo type carbides was relatively small as 250 nm, the lower limit amplitude value of stress intensity factor $\Delta K_{Ith}$(MPam$^{1/2}$) shows a large value of 8.2 (MPam$^{1/2}$). It can be seen from the foregoings that the lower limit amplitude value of stress intensity factor $\Delta K_{Ith}$(MPam$^{1/2}$) can be improved to suppress extension of initial fine cracking if the average grain size of the Mo type carbides can be controlled to a size between 50 to 300 nm.

Figure 6:
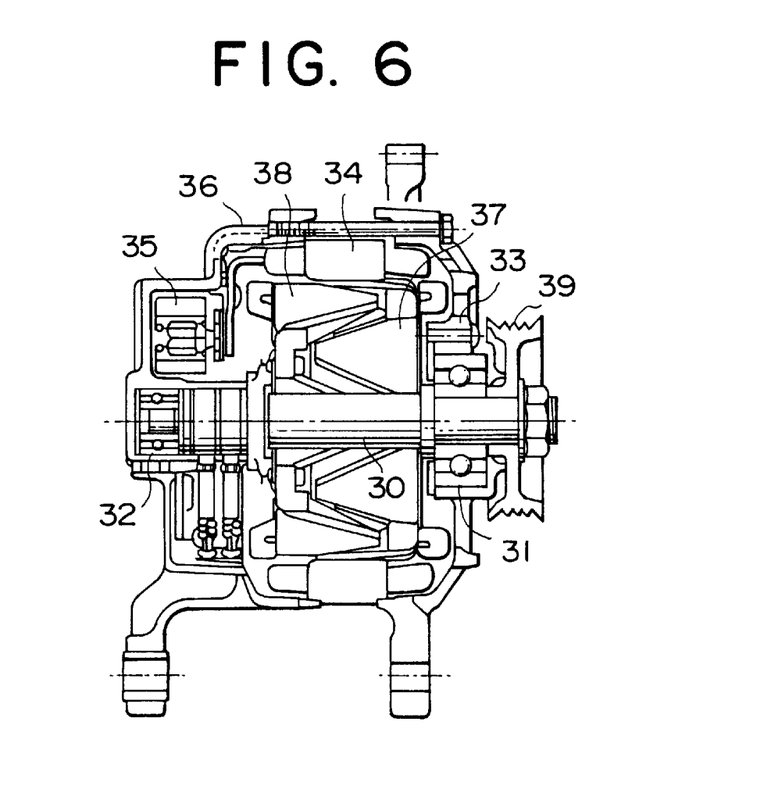
FIG. 6 is a schematic view for an example of an AC generator as a life testing equipment for a rolling bearing.

Then, descriptions are to be made for a bearing life test different from the foregoings. Comparative Test 3 Life test for high speed rotation at high temperature 3-1 Test Equipment An AC generator for vehicles shown in FIG. 6 was used as a testing equipment. A front side bearing 31 for supporting a shaft 30 of the AC generator is evaluated. This is because the bearing load on the front side bearing 31 is 4 times or more the load on the rear side bearing 32. In this AC generator, a bearing box 33 for holding a single row bearing as the front side bearing 31, and a housing 36 for holding a stator 34 and a rectifier 35 are integrally formed by aluminum die casting, vent holes are formed to the outer periphery of the bearing box 33 for cooling heat generating components such as incorporated stator 34, rotor 37 or rotational member 38, and the bearing box 33 is secured by way of a plurality of spokes to the housing 36. The outer ring of the front side bearing 31 is secured to the bearing box 33 and the inner ring is driven by a pulley 39 secured by way of a shaft 30. A tension applied to the belt wound around the pulley 39 forms a radial load which is transmitted to the outer ring by way of plurality of rolling elements situated in a load area to be applied with the load.

3-2 Test Bearing

Factors for the rolling bearing as a test specimen used in this life test were those JIS bearing No. 6303 and sealed with grease. Further, SUJ2 steel balls were used as the rolling element of the rolling bearing as the test specimen used. Further, for the ingredients of the inner and the outer rings, the tempering temperature and the amount of residual austenite ($\gamma_R$), Example 21 to Example 24 and Comparative Example 15 to Comparative Example 18 in Table 1 were added in addition to Example 13 to Example 20 and Comparative Example 10 to Comparative Example 14 in the table. Each of Examples 21 to 24 is for the rolling bearing according to the present invention which contains: C=0.65 to 1.25% (recommended value: 0.65 to 1.10%), Si=0.7 to 2.5%, Cr=0.5 to 3.0% (recommended value: 0.5 to 1.15%), and also contains at least: Mo=0.5 to 3.0% (recommended value: 1.1 to 3.0%), which is applied with a tempering treatment at 300° C. to 450° C. to satisfy the condition that the amount of residual austenite is 1% or less. On the other hand, Comparative Example 15 is different from the present invention regarding each of C, Cr contents. Further, Comparative Example 16 is different from the recommended value of the present invention regarding Mo content. Further, Comparative Example 17 is different from the present invention regarding the Mo content and is different from the recommended value of the present invention regarding the Cr content, the tempering temperature and the amount of residual austenite ($\gamma_R$). Further, Comparative Example 18 is different from the present invention regarding the Mo content. Further, for the Examples 21 to 24 and Comparative Examples 17, 18, inner rings and outer rings were heated in air at 150 to 350° C. for several minutes, for once to three times divisionally, to form iron oxide layers on the raceway surface. However, for Comparative Examples 17, 18, the condition for the re-heating layer treatment were changed to make the thickness of the oxide layer formed different from that of the present invention. Then, the surface hardness was HRC 55 to 63 and the amount of residual austenite $\gamma_R$ was 0 to 6% for the inner and outer rings, and the rolling elements, and the surface roughness was 0.01 to 0.04 μm Ra for the inner rings and the outer rings and the surface roughness for the rolling element was 0.003 to 0.010 μm Ra.

3-3: Test Method

An engine endurance test disclosed in [SAE Technical Paper: SAE 950944] is conducted. Engine rapid acceleration/deceleration test for switching the number of rotation to 2000 rpm and 14000 rpm on every predetermined time was used. During the test, a heater was disposed around the tested bearing and the test was conducted at a constant temperature of 180° C. The load conditions for this test were set as P (load applied)/C (dynamic rated load)=0.14. Further, the calculated life of the tested bearing in this case is 760 hr and, accordingly, the test termination time was set to 1000 hours. The number of test specimen was n=10 for each case. For the judgement of the absence or presence of flaking, the test was interrupted at the instance the state of vibrations reached five times the initial vibration and presence existence of flaking was confirmed.

3-4: Test Result

Table 5 shows, as the test result, the evaluation time bearing life), absence or presence of flaking (damage) regarding each specimen, as well as the size of Mo type carbides, layer thickness, surface hardness and factors for the re-heating layer treatment regarding each specimen.

TABLE 5

Result of Engine Test

|  |  | Mo type carbides size (nm) | Layer thickness (nm) | Surface hardness (HRC) | Re-heating layer treatment | Evaluation time (hr) | Absence or presence of flaking |
|---|---|---|---|---|---|---|---|
| Example | 13 | 106 | — | 61 | — | 1000 | no |
|  | 14 | 300 | — | 59 | — | 1000 | no |
|  | 15 | 50 | — | 59 | — | 1000 | no |
|  | 16 | 145 | — | 60 | — | 1000 | no |
|  | 17 | 245 | — | 58 | — | 1000 | no |
|  | 18 | 211 | — | 60 | — | 1000 | no |
|  | 19 | 64 | — | 57 | — | 1000 | no |
|  | 20 | 79 | — | 56 | — | 1000 | no |
|  | 21 | 230 | 5 | 60 | 220° C. × 30 min | 1500 | no |
|  | 22 | 70 | 20 | 59 | 300° C. × 20 min | 1500 | no |
|  | 23 | 236 | 50 | 57 | 260° C. × 60 min | 1500 | no |
|  | 24 | 59 | 100 | 56 | 400° C. × 10 min | 1500 | no |
| Comp. Example | 10 | — | — | 58 | — | 126 | flaking in 10/10 of outer ring |
|  | 11 | 475 | — | 60 | — | 234 | flaking in 10/10 of outer ring |
|  | 12 | — | — | 59 | — | 131 | flaking in 10/10 of outer ring |
|  | 13 | 510 | — | 56 | — | 212 | flaking in 10/10 of outer ring |
|  | 14 | 250 | — | 54 | — | 71 | flaking in 10/10 of outer ring |
|  | 15 | 200 | — | 57 | — | 107 | flaking in 10/10 of outer ring |
|  | 16 | 950 | — | 56 | — | 139 | flaking in 10/10 of outer ring |
|  | 17 | — | 0.5 | 55 | 170° C. × 60 min | 118 | flaking in 10/10 of outer ring |
|  | 18 | — | 1200 | 54 | 450° C. × 20 min | 125 | flaking in 10/10 of inner and outer rings |

Figure 7:
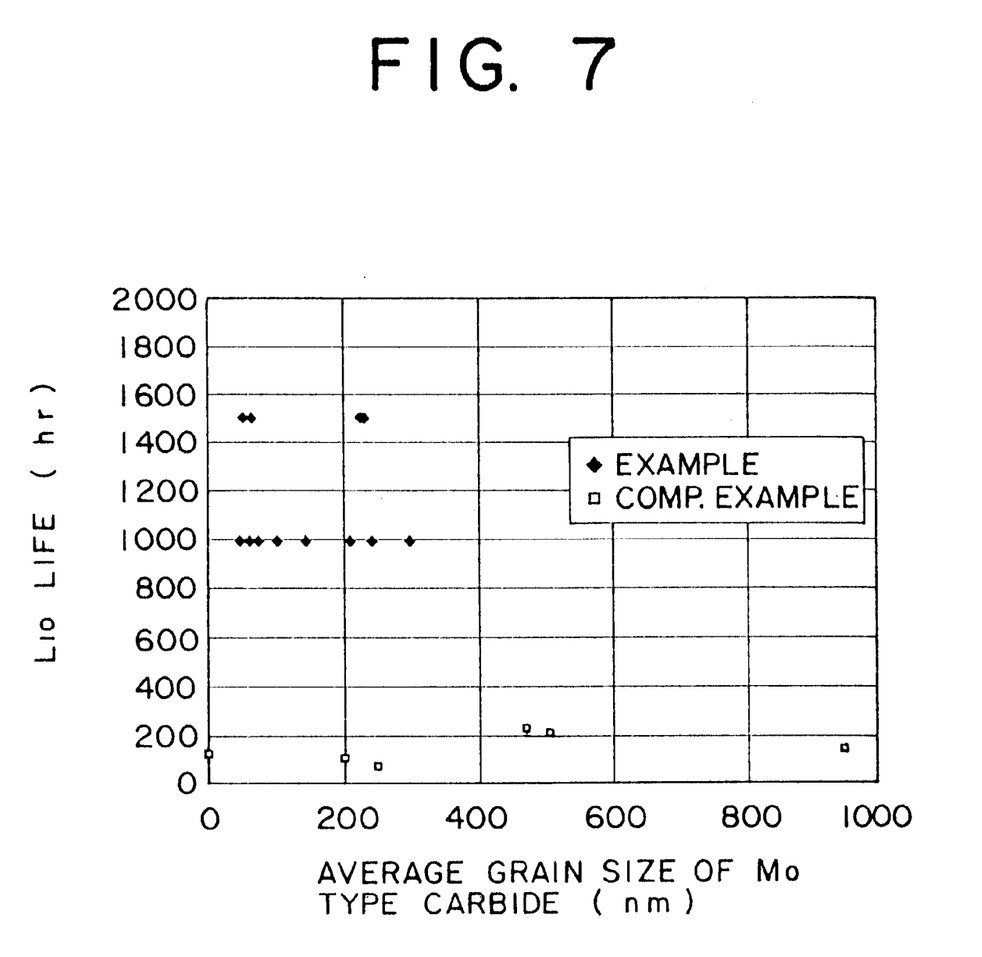
FIG. 7 is a graph showing a relationship between an average grain size of carbides and a bearing life.

Further, FIG. 7 shows a relationship between the average grain size of the Mo type carbides and the evaluation time (bearing life) on each of the specimens shown in Table 5 as a graph.

Among them, in Examples 13 to 20, since Mo type carbides with the average grain size of 50 to 300 nm respectively were dispersingly precipitated, flaking was not caused even the $L_{10}$ life reached 1000 hr. This is because surface hardness was as high as HRC 56 or more, the Si content having a large effect of retarding the tissue change was as high as 0.7% or more and occurrence and extension of fine cracks near the maximum shearing stress forming position under the rolling surface were suppressed by the fine Mo type carbides.

Further, in each of the Examples 21 to 24, flaking was not caused even when the $L_{10}$ life reached 1500 hr due to the composite effect of the hydrogen intrusion inhibitive effect by the oxide layer of 5 to 100 nm thickness, in addition to the effect of the fine Mo type carbides under the rolling surface.

On the other hand, in Comparative Example 10, since a high temperature tempering treatment at 250° C. was conducted to SUJ2, the surface hardness was as high as HRC 58 and neither increasing of the vibration value nor seizing due to the dimensional change was recognized in the test circumstance at 180° C. However, since Mo was not added, no fine carbides were precipitated and it was not effective to the rolling contact fatigue, so that flaking was caused to the outer ring in 10 out of 10 specimens and the $L_{10}$ life was 126 hr, which was 1/6 or less of the calculated life. Also in Comparative Example 12, since Si was added, the surface hardness was as high as HRC 59 even when conducting high temperature tempering at 300° C. However, since no Mo type fine carbides were precipitated, flaking was caused to the outer ring in 10 out of 10 specimens and the $L_{10}$ life was 131 hr, which was 1/6 or less of the calculated life.

In Comparative Examples 11, 13, Mo was added by 1.0%, 1.9%, respectively, but since the average grain size of the Mo type carbides was excessively large as 475 nm and 510 nm in each case, surface initiation point flaking was caused to the outer ring in 10 out of 10 specimens and the $L_{10}$ life was 234 hr, 212 hr, which was 1/3 or less of the calculated life.

In comparative Examples 14, 15, although the Mo type carbides with addition of Mo were fine as 250 nm, 200 nm, since the amount of C was as low as 0.51% in Comparative Example 14, the surface hardness was as low as HRC 54 and the fatigue strength was not enough, so that the $L_{10}$ life was 71 hr, which was 1/10 or less of the calculated life. Further, in Comparative Example 15, since the amount of C was as high as 38%, macro carbides were formed on the surface of the bearing ring and surface initiation flaking was caused to the outer ring in 10 out of 10 specimens and the $L_{10}$ life was 107 hr, which was 1/7 or less of the calculated life.

In Comparative Example 16, since the Mo addition amount was as low as 0.6%, macro Mo type carbides with average grain size of 950 nm were precipitated partially, no dispersing effect was obtained and no effect for the cracking extension characteristic was observed and flaking was caused to the outer ring in 10 out of 10 specimens and the $L_{10}$ life was 139 hr, which was 1/5 or less of the calculated life.

In Comparative Example 17, since the thickness of the iron oxide layer was as small as 0.5 nm, the layer on the raceway surface was completely fractured after the end of the test, flaking was caused to the outer ring in 10 out of 10 specimens and the $L_{10}$ life was 118 hr, which was 1/7 of the calculated life. Further, in Comparative Example 18, although an oxide layer of 1200 nm was formed on the raceway surface, it formed scales to embrittle the raceway surface and a lot of pits were formed on the surface. Further, flaking portions were present both in the inner ring and the outer ring together. Accordingly, flaking was caused from the pit initiation points of them and the $L_{10}$ life was as short as 125 hr.

From the foregoing result, it is possible, by dispersingly precipitating fine Mo type carbides of 50 to 300 nm size on the rolling surface, to suppress the extension of fine cracks to expect the effect of prolonging the rolling life under large vibrations and heavy load. Further, it is possible, by disposing the iron chromium oxide type layer (re-heating oxidized layer) of 5 to 100 nm thickness on the surface of the bearing, to suppress stress corrosion cracking flaking caused by intrusion of hydrogen created by decomposition of several % water content contained in the lubricant.

The bearing material was dried spontaneously after heat treatment and grinding in this test, but it is actually desirable that oils and fats deposited on the surface of metals after grinding are degreased (for example, solvent degrease or alkali degrease) and, subsequently, they were heated in air to form iron oxide type oxide layer. Further, the oxide layer treatment can be conducted after assembling the inner ring, the outer ring and the rolling element as a bearing. Further, it is desirable that the oxide layer is formed only on the race surface by a high-frequency heating treatment.

Further, in the embodiments described above, while descriptions have been made as only under the condition of high speed rotation, the life can be prolonged by using the rolling bearing according to the present invention also in a case, for example, in a low A region in which a sliding ratio increases as in the boundary lubrication, or in a case where the flaking of the rolling element increases as in a high vibration circumstance.

INDUSTRIAL APPLICABILITY

As apparent from the foregoing descriptions, in accordance with the rolling bearing of the present invention, it is possible to attain a hydrogen trapping effect by dispersingly precipitating Mo type or Ti type carbides finely on the surface of a bearing ring of a rolling bearing used under a high temperature circumstance, thus enabling to prevent hydrogen from intruding in the vicinity of the maximum shearing stress position where the rolling contact fatigue stress is greatest and also suppress and prevent occurrence and extension of fine initial cracks by dispersingly precipitating Mo type carbides finely thereby greatly prolonging the rolling life under high temperature, large vibrations and heavy load.

What is claimed is:

1. A rolling bearing in which a plurality of rolling elements are disposed in use between bearing rings comprising a fixed ring and a rotational ring wherein at least one of the bearing rings contains: C=0.65–1.25%, Si=0.7–2.5%, Cr=0.5–3.0% and also contains at least one of: Mo=0.5–3.0% and Ti=0.05–0.5%, and Mo type carbides or Ti type carbide with an average grain size of 50 to 300 nm are dispersingly precipitated finely.

2. A rolling bearing as defined in claim 1, wherein the C content is defined as 0.65–1.10%, the Cr content is defined as 0.5–1.15% and the Mo content is defined as 1.1–3.0% in at least one of the bearing rings.

3. A rolling bearing as defined in claim 2, wherein an oxide layer of 5 to 100 nm is formed to at least one of the bearing rings.

4. A rolling bearing as defined in claim 2, wherein an amount of residual austenite in at least one of the rolling bearing rings is 3% or less.

5. A rolling bearing as defined in claim 2, wherein an amount of residual austenite in at least one of the rolling bearing rings is 1% or less.

6. A rolling bearing as defined in claim 2, wherein an amount of residual austenite in at least one of the rolling bearing rings is 0%.

7. A rolling bearing as defined in claim 2, wherein a lower limit value of stress intensity factor is from 7.6 to 12.1 MPam$^{1/2}$.

8. A rolling bearing as defined in claim 2, wherein one of the rolling bearing rings is a fixed ring.

9. A rolling bearing as defined in claim 2, which is used for a vehicle generator.

10. A rolling bearing as defined in claim 1, wherein an oxide layer of 5 to 100 nm is formed to at least one of the bearing rings.

11. A rolling bearing as defined in claim 10, wherein an amount of residual austenite in at least one of the rolling bearing rings is 3% or less.

12. A rolling bearing as defined in claim 10, wherein an amount of residual austenite in at least one of the rolling bearing rings is 1% or less.

13. A rolling bearing as defined in claim 10, wherein an amount of residual austenite in at least one of the rolling bearing rings is 0%.

14. A rolling bearing as defined in claim 10, wherein a lower limit value of stress intensity factor is from 7.6 to 12.1 MPam$^{1/2}$.

15. A rolling bearing as defined in claim 10, wherein one of the rolling bearing rings is a fixed ring.

16. A rolling bearing as defined in claim 10, which is used for a vehicle generator.

17. A rolling bearing as defined in claim 1, wherein an amount of residual austenite in at least one of the rolling bearing rings is 3% or less.

18. A rolling bearing as defined in claim 17, which is used for a vehicle generator.

19. A rolling bearing as defined in claim 17, wherein a lower limit value of stress intensity factor is from 7.6 to 12.1 MPam$^{1/2}$.

20. A rolling bearing as defined in claim 17, wherein one of the rolling bearing rings is a fixed ring.

21. A rolling bearing as defined in claim 1, wherein an amount of residual austenite in at least one of the rolling bearing rings is 1% or less.

22. A rolling bearing as defined in claim 21, wherein a lower limit value of stress intensity factor is from 7.6 to 12.1 MPam$^{1/2}$.

23. A rolling bearing as defined in claim 21, wherein one of the rolling bearing rings is a fixed ring.

24. A rolling bearing as defined in claim 21, which is used for a vehicle generator.

25. A rolling bearing as defined in claim 1, wherein an amount of residual austenite in at least one of the rolling bearing rinds is 0%.

26. A rolling bearing as defined in claim 25, wherein one of the rolling bearing rings is a fixed ring.

27. A rolling bearing as defined in claim 25, wherein a lower limit value of stress intensity factor is from 7.6 to 12.1 MPam$^{1/2}$.

28. A rolling bearing as defined in claim 25, which is used for a vehicle generator.

29. A rolling bearing as defined in claim 1, wherein a lower limit value of stress intensity factor is from 7.6 to 12.1 MPam$^{1/2}$.

30. A rolling bearing as defined in claim 29, which is used for a vehicle generator.

31. A rolling bearing as defined in claim 29, wherein one of the rolling bearing rings is a fixed ring.

32. A rolling bearing as defined in claim 1, wherein one of the rolling bearing rings is a fixed ring.

33. A rolling bearing as defined in claim 32, which is used for a vehicle generator.

34. A rolling bearing as defined in claim 1, which is used for a vehicle generator.

* * * * *

UNITED STATES PATENT AND TRADEMARK OFFICE
CERTIFICATE OF CORRECTION

PATENT NO.     : 6,357,924 B1
DATED          : March 19, 2002
INVENTOR(S)    : Takemura et al.

It is certified that error appears in the above-identified patent and that said Letters Patent is hereby corrected as shown below:

<u>Title page,</u>
Item [30], add the Foreign Application Priority Data

-- Dec. 21, 1998     (JP)     10-362,992 --.

Signed and Sealed this

Twenty-fourth Day of September, 2002

Attest:

Attesting Officer

JAMES E. ROGAN
*Director of the United States Patent and Trademark Office*